US012275238B2

(12) United States Patent
Yamaguchi et al.

(10) Patent No.: US 12,275,238 B2
(45) Date of Patent: Apr. 15, 2025

(54) IMAGE RECORDING APPARATUS

(71) Applicant: BROTHER KOGYO KABUSHIKI KAISHA, Nagoya (JP)

(72) Inventors: Masatomo Yamaguchi, Inazawa (JP); Yuya Tatematsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 182 days.

(21) Appl. No.: 18/177,453

(22) Filed: Mar. 2, 2023

(65) Prior Publication Data

US 2023/0286296 A1 Sep. 14, 2023

(30) Foreign Application Priority Data

Mar. 11, 2022 (JP) ................................ 2022-037974

(51) Int. Cl.

*B41J 11/00* (2006.01)
*B41J 11/66* (2006.01)
*B41J 11/70* (2006.01)
*B41J 15/04* (2006.01)

(52) U.S. Cl.

CPC ............ *B41J 11/006* (2013.01); *B41J 11/663* (2013.01); *B41J 11/70* (2013.01); *B41J 15/04* (2013.01)

(58) Field of Classification Search

CPC ......... B41J 11/006; B41J 11/663; B41J 11/70; B41J 15/04
See application file for complete search history.

(56) References Cited

U.S. PATENT DOCUMENTS

| | | | | |
|---|---|---|---|---|
| 5,758,248 | A * | 5/1998 | Yoshiuchi | G03G 15/652 399/385 |
| 2011/0012972 | A1 | 1/2011 | Nitta | |
| 2013/0027465 | A1 | 1/2013 | Yamamoto et al. | |
| 2015/0309465 | A1* | 10/2015 | Matsumoto | G03G 15/652 399/21 |
| 2021/0237492 | A1* | 8/2021 | Watari | B65H 7/04 |
| 2022/0097415 | A1* | 3/2022 | Daigo | B41J 29/17 |

FOREIGN PATENT DOCUMENTS

| | | | |
|---|---|---|---|
| JP | H09-038894 | A | 2/1997 |
| JP | 2011-020302 | A | 2/2011 |
| JP | 2013-028132 | A | 2/2013 |
| JP | 2021-160880 | A | 10/2021 |

* cited by examiner

*Primary Examiner* — Henok D Legesse
(74) *Attorney, Agent, or Firm* — KENEALY VAIDYA LLP

(57) ABSTRACT

An image recording apparatus includes a conveyer, a cutter, a recording engine, a jam handling detector, and a controller. The conveyer includes a roller pair disposed downstream of the cutter in a conveying direction, configured to nip the recording medium, and configured to rotate in a forward rotation direction to convey the recording medium in the conveying direction. The controller conveys the recording medium such that a leading edge moves from upstream to downstream of the roller pair in the conveying direction after the jam handling detector detecting that a jam handling has been executed, cuts the recording medium conveyed to a position where the leading edge is downstream of the roller pair with the cutter while nipping the leading edge with the roller pair, and does not execute a skew correction when executing the post-jam conveyance.

16 Claims, 9 Drawing Sheets

IMAGE RECORDING APPARATUS

REFERENCE TO RELATED APPLICATIONS

This application claims priority from Japanese Patent Application No. 2022-037974 filed on Mar. 11, 2022. The entire content of the priority application is incorporated herein by reference.

BACKGROUND ART

Aspects of the present disclosure relate to an image recording apparatus configured to record an image on a recording medium unwound from a roll body.

There has been known an image recording apparatus in which a recording medium is conveyed by a roller pair to record an image. As an image recording apparatus of this type, there has been known a printer including a registration roller pair configured to correct skew of a sheet (recording medium). In such a printer, a leading edge of the sheet conveyed to the registration roller pair comes into contact with the registration roller pair in a non-rotating state, and thereby skew of the sheet is corrected.

There has also been known a printer configured to record an image on a roll sheet (a recording medium unwound from a roll body). The printer is provided with a cutting mechanism (a cutter) configured to cut the roll sheet along a width direction.

DESCRIPTION

In an image recording apparatus configured to record an image an image on a recording medium unwound from a roll body like the printer mentioned above, when a jam occurs, the user may cut the recording medium with scissors or the like without cutting the recording medium with the cutter of the image recording apparatus. When the user cuts the recording medium, the leading edge of the recording medium may become oblique (i.e., may not be perpendicular to a conveying direction of the recording medium).

If the leading edge of the recording medium is oblique, the skew correction cannot be performed by the method mentioned above. That is, if the leading edge of the recording medium which is oblique is brought into contact with a roller pair in a non-rotating state, the recording medium skews. If the recording medium is conveyed in such a state, the recording medium will be skewed and a jam will become more likely to occur.

At least one aspect of the present disclosure is advantageous to provide one or more improved techniques to achieve an image recording apparatus configured to cut a recording medium along a line perpendicular to a conveying direction of the recording medium after fixing a jam of the recording medium.

According to aspects of the present disclosure, there is provided an image recording apparatus configured to record an image on a recording medium unwound from a roll body in which a long recording medium is wound in a roll shape. The image recording apparatus includes a conveyer configured to convey the recording medium in a conveying direction, a cutter configured to cut the recording medium along a direction perpendicular to the conveying direction, a recording engine configured to record an image on the recording medium, a jam handling detector configured to detect that a jam handling of cutting the recording medium has been executed, and a controller. The conveyer includes a roller pair that is disposed downstream of the cutter in the conveying direction, configured to nip the recording medium, and configured to rotate in a forward rotation direction which is a direction for conveying the nipped recording medium in the conveying direction. The controller executes a post-jam conveyance of conveying the recording medium such that a leading edge, which is a downstream end of the recording medium in the conveying direction, moves from upstream to downstream of the roller pair in the conveying direction after the jam handling detector detecting that the jam handling has been executed, executes cutting of the recording medium conveyed to a position where the leading edge is downstream of the roller pair in the conveying direction by the post-jam conveyance with the cutter while nipping the leading edge with the roller pair, and does not execute a skew correction when executing the post-jam conveyance, wherein, in the skew correction, the controller controls the conveyer to cause the leading edge to come into contact with the roller pair while not causing the roller pair to rotate in the forward rotation direction.

Figure 1:
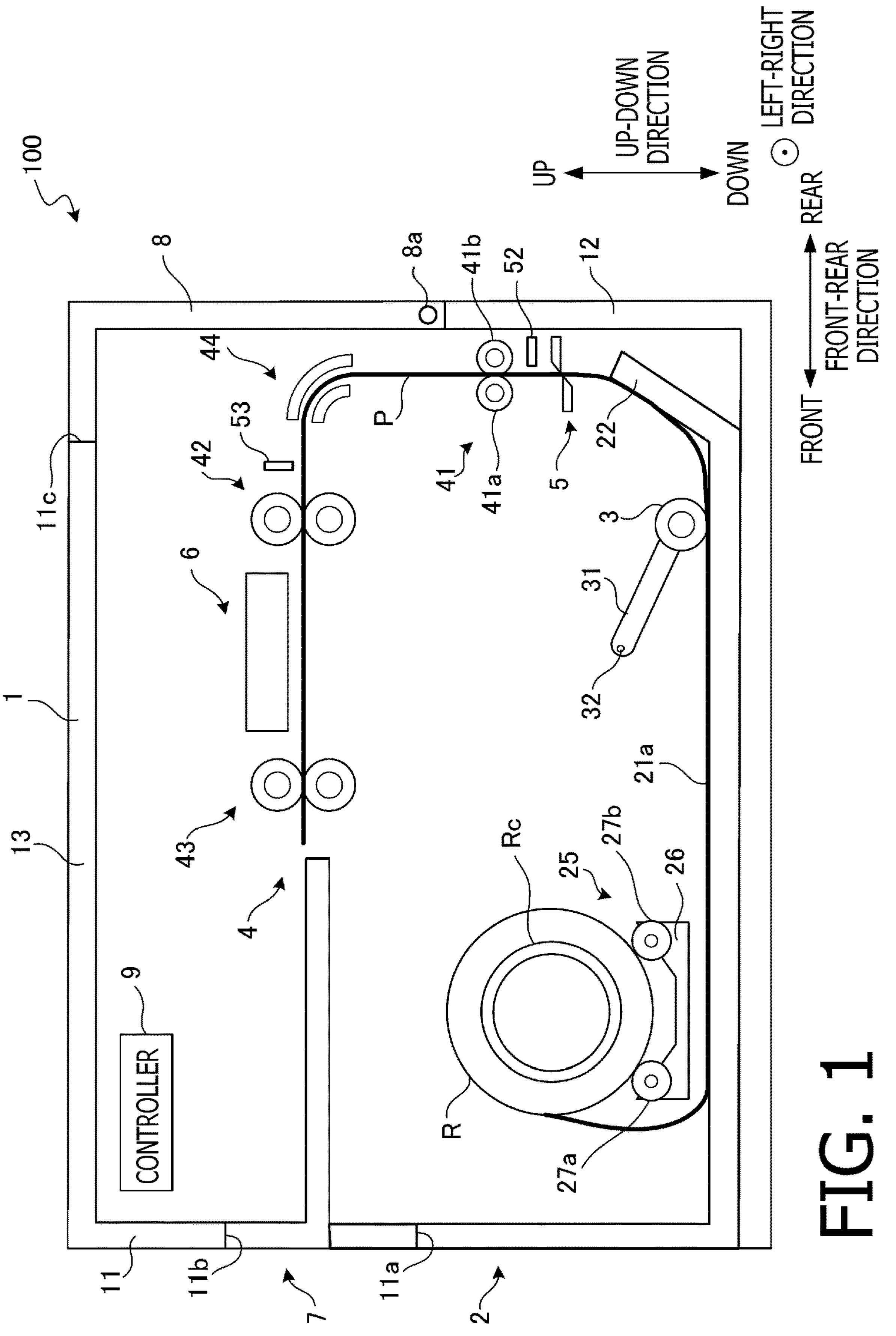
FIG. 1 is a schematic side view showing an internal structure of a printer.

A printer 100 as an illustrative embodiment according to aspects of the present disclosure will be described with reference to FIGS. 1 and 2. In the following description, an up-down direction, a front-rear direction and a left-right direction are defined as shown in FIG. 1. Specifically, the left-hand side in FIG. 1 is defined as a front side of the printer 100, the right-hand side in FIG. 1 is defined as a rear side of the printer 100, the upper side in FIG. 1 is defined as an upper side of the printer 100, and the lower side in FIG. 1 is defined as a lower side of the printer 100. A direction perpendicular to a plane of FIG. 1 is referred to as a left-right direction of the printer 100.

Overall Configuration of Printer 100

As shown in FIG. 1, the printer 100 mainly includes a housing 1, a feed tray 2, a conveyer 4, a cutter 5, a recording engine 6, a discharge tray 7, a cover 8, and a controller 9.

An opening 11*a* and an opening 11*b* are formed to a front wall 11 of the housing 1. The opening 11*a* and the opening 11*b* are arranged vertically. The opening 11*a* is located below the opening 11*b*. The opening 11*a* is a gateway for inserting and removing the feed tray 2 into and from the housing 1. The opening 11*b* is a gateway for inserting and removing the discharge tray 7 into and from the housing 1. An opening 11*c* is also formed to the housing 1. The opening 11*c* is formed across a rear wall 12 and an upper wall 13. The cover 8 is attached to the housing 1 to cover the opening 11*c*.

The feed tray 2 is detachably supported by the housing 1 at a lower portion of the housing 1. The feed tray 2 can be inserted into and removed from the housing 1 in the front-rear direction through the opening 11*a* formed to the housing 1. The feed tray 2 is located below the recording engine 6 when the feed tray 2 is mounted to the housing 1. The insertion and removal of the feed tray 2 into and from the housing 1 can be detected using a tray sensor 51 (see FIG. 2).

The feed tray 2 includes a roll body accommodating part 25 configured to accommodate a roll body R. The feed tray 2 may be configured to accommodate cut sheets in addition to the roll body R. The roll body R is formed by winding a long sheet P in a roll shape on an outer peripheral surface of a cylindrical core member Rc. The roll body accommodating part 25 accommodates the roll body R such that an axial direction of the roll body R coincides with the left-right direction.

The roll body accommodating part 25 includes a support base 26, and two rollers 27*a* and 27*b*. The support base 26 extends in the left-right direction. The rollers 27*a* and 27*b* extend in the left-right direction and are arranged so as to be separated from each other in the front-rear direction. The rollers 27*a* and 27*b* are supported on upper ends of the support base 26 end of the support base (26) so as to be rotatable about rotation axes extending in the left-right direction. The rollers 27*a* and 27*b* support the roll body R from below while being in contact with a lower portion of an outer peripheral surface of the roll body R.

The sheet P unwound from the roll body R accommodated in the roll body accommodating part 25 is drawn from the front side to the rear side of the support base 26 through a gap between a lower surface of the support base 26 and a bottom surface 21*a* of the feed tray 2.

The conveyer 4 conveys the sheet P unwound from the roll body R accommodated in the feed tray 2 in a conveying direction. The conveying direction is a direction for unwinding the sheet P from the roll body R. The conveyer 4 mainly includes a feed roller 3, an intermediate roller pair 41, a conveying roller pair 42, a discharge roller pair 43, and a guide member 44.

The feed roller 3 feeds the sheet P unwound from the roll body R accommodated in the roll body accommodating part 25 from the feed tray 2. The feed roller 3 conveys the sheet P in the feed tray 2 in the direction from the front to the rear.

The feed roller 3 is driven by a feed motor 3*a* (see FIG. 2) and rotates about a rotation axis extending in the left-right direction. The feed roller 3 is supported at a distal end of an arm 31. The arm 31 is rotatably supported by a support shaft 32. The support shaft 32 is supported by the housing 1. The arm 31 is urged by a conventionally-known urging member such as a spring so that the feed roller 3 approaches the bottom surface 21*a* of the feed tray 2. The arm 31 is configured to retract, in conjunction with the movement of the feed tray 2 from the inside of the housing 1 to the outside of the housing 1, to a position where the arm 31 does not interfere with the moving feed tray 2.

When the feed motor 3*a* is driven under the control of the controller 9, the feed roller 3 rotates, and a conveying force in the direction from the front to the rear is applied to the sheet P in contact with the feed roller 3. As a result, the sheet P is fed from the feed tray 2. In the feed tray 2 mounted in the housing 1, a rear wall 22 located at a rear end portion of the feed tray 2 is inclined so that an upper end of the rear wall 22 is located behind a lower end of the rear wall. Therefore, the sheet P fed from the feed tray 2 is guided obliquely upward by the rear wall 22 of the feed tray 2.

The intermediate roller pair 41 includes a drive roller 41*a* configured to be driven to rotate by an intermediate motor 61 (see FIG. 2), and a driven roller 41*b* configured to rotate together with the drive roller 41*a*. Both the drive roller 41*a* and the driven roller 41*b* are configured to rotate about rotation axes extending in the left-right direction. The intermediate roller pair 41 is disposed near the rear wall 12 of the housing 1. The driven roller 41*b* is disposed behind the drive roller 41*a*.

When the intermediate motor 61 is driven under the control of the controller 9, the intermediate roller pair 41 rotates while nipping the sheet P and conveys the sheet P in the conveying direction. A direction in which the intermediate roller pair 41 rotates so that the sheet P is conveyed in the conveying direction is defined as a forward direction. The intermediate roller pair 41 is located above the rear wall 22 of the feed tray 2. The intermediate roller pair 41 nips the sheet P that is fed obliquely upward from the feed tray 2 and conveys the sheet P upward.

A first sheet detection sensor 52 is provided near the intermediate roller pair 41. The first sheet detection sensor 52 is located upstream of the intermediate roller pair 41 in the conveying direction. The first sheet detection sensor 52 is located downstream of the cutter 5 in the conveying direction. The first sheet detection sensor 52 is configured to detect the sheet P.

The guide member 44 is disposed above the intermediate roller pair 41. The guide member 44 guides the sheet P conveyed upward by the intermediate roller pair 41 forward.

The conveying roller pair 42 is disposed downstream of the intermediate roller pair 41 in the conveying direction. The conveying roller pair 42 includes a drive roller configured to be driven to rotate by a conveying motor 62 (see FIG. 2), and a driven roller configured to rotate together with the drive roller. The discharge roller pair 43 is disposed downstream of the conveying roller pair 42 in the conveying direction. The discharge roller pair 43 includes a drive roller configured to be driven to rotate by a discharge motor 63 (see FIG. 2), and a driven roller configured to rotate together with the drive roller. Each of the rollers of the conveying roller pair 42 and the discharge roller pair 43 is configured to rotate about a rotation axis extending in the left-right direction.

When the conveying motor 62 and the discharge motor 63 are driven under the control of the controller 9, the conveying roller pair 42 and the discharge roller pair 43 rotate while nipping the sheet P and convey the sheet P in the conveying direction. The conveying roller pair 42 is disposed behind the recording engine 6, and the discharge roller pair 43 is disposed in front of the recording engine 6. The conveying roller pair 42 conveys the sheet P guided forward by the guide member 44 forward while nipping the sheet P. The discharge roller pair 43 conveys the sheet P conveyed forward by the conveying roller pair 42 forward while nipping the sheet P.

A second sheet detection sensor 53 is provided near the conveying roller pair 42. The second sheet detection sensor 53 is disposed upstream of the conveying roller pair 42 in the conveying direction. The second sheet detection sensor 53 is disposed downstream of the guide member 44 in the conveying direction. The second sheet detection sensor 53 is configured to detect the sheet P.

The cutter 5 is disposed between the rear wall 22 of the feed tray 2 and the intermediate roller pair 41. The cutter 5 includes, for example, a rotary blade and a fixed blade. The cutter 5 may include a disc-shaped rotary blade and a disc-shaped driven blade. The rotary blade rotates and the cutter 5 reciprocates in the left-right direction by a driving force of a cutting motor 5*a* (see FIG. 2). As the cutting motor 5*a* is driven under the control of the controller 9, the sheet P unwound from the roll body R and conveyed is cut by the cutter 5 along a width direction of the sheet P (i.e., a direction perpendicular to the conveying direction by the conveyer 4).

The recording engine 6 includes a conventionally-known head having a plurality of nozzles formed on a lower surface thereof, and a conventionally-known driver IC. The recording engine 6 records an image on a sheet P conveyed by the conveyer 4. When the driver IC is driven under the control of the controller 9, ink is ejected from the nozzles of the head, and an image is formed on the sheet P when the sheet P conveyed by the conveyer 4 passes through an image recording position opposed to the lower surface of the head. The recording engine 6 may be either a line type in which ink is ejected from the nozzles of the head whose position is fixed, or a serial type in which ink is ejected from the nozzles of the head moving in the left-right direction.

The discharge tray 7 is disposed in the housing 1 in front of the recording engine 6 and above the feed tray 2. The discharge tray 7 can be inserted into and removed from the housing 1 in the front-rear direction through the opening 11*b* formed to the housing 1. The discharge tray 7 receives a sheet P on which an image has been formed by the recording engine 6 and which has been conveyed forward by the discharge roller pair 43.

The cover 8 is attached to the housing 1 to cover the opening 11*c*. The cover 8 is configured to pivot about a shaft 8*a* extending in the left-right direction. The shaft 8*a* is at a lower end portion of the cover 8. The cover 8 is openable and closable with respect to the housing 1 by pivoting about the shaft 8*a*.

When the cover 8 is in the closed state, the cover 8 covers a portion of a conveying path for the sheet P in the conveyer 4 between the intermediate roller pair 41 and the conveying roller pair 42. That is, the cover 8 in the closed state is at a covering position. When the cover 8 is in the open state, the portion of the conveying path for the sheet P in the conveyer 4 between the intermediate roller pair 41 and the conveying roller pair 42 is exposed. That is, the cover 8 in the open state is at an exposing position. Opening and closing of the cover 8 can be detected by an opening/closing sensor 54 (see FIG. 2).

The controller 9 is configured to control the entire printer 100. As shown in FIG. 2, the controller 9 is electrically connected to the feed motor 3*a*, the intermediate motor 61, the conveying motor 62, the discharge motor 63, the cutting motor 5*a*, the recording engine 6, and a display 10. The controller 9 is also connected to the tray sensor 51, the first sheet detection sensor 52, the second sheet detection sensor 53, and the opening/closing sensor 54.

The display 10 is provided on an outer surface of the housing 1. The display 10 is of the touch panel type. The display 10 displays various kinds of information relating to the printer 100 to be notified to the user. The display 10 also receives input by the user.

Figure 2:
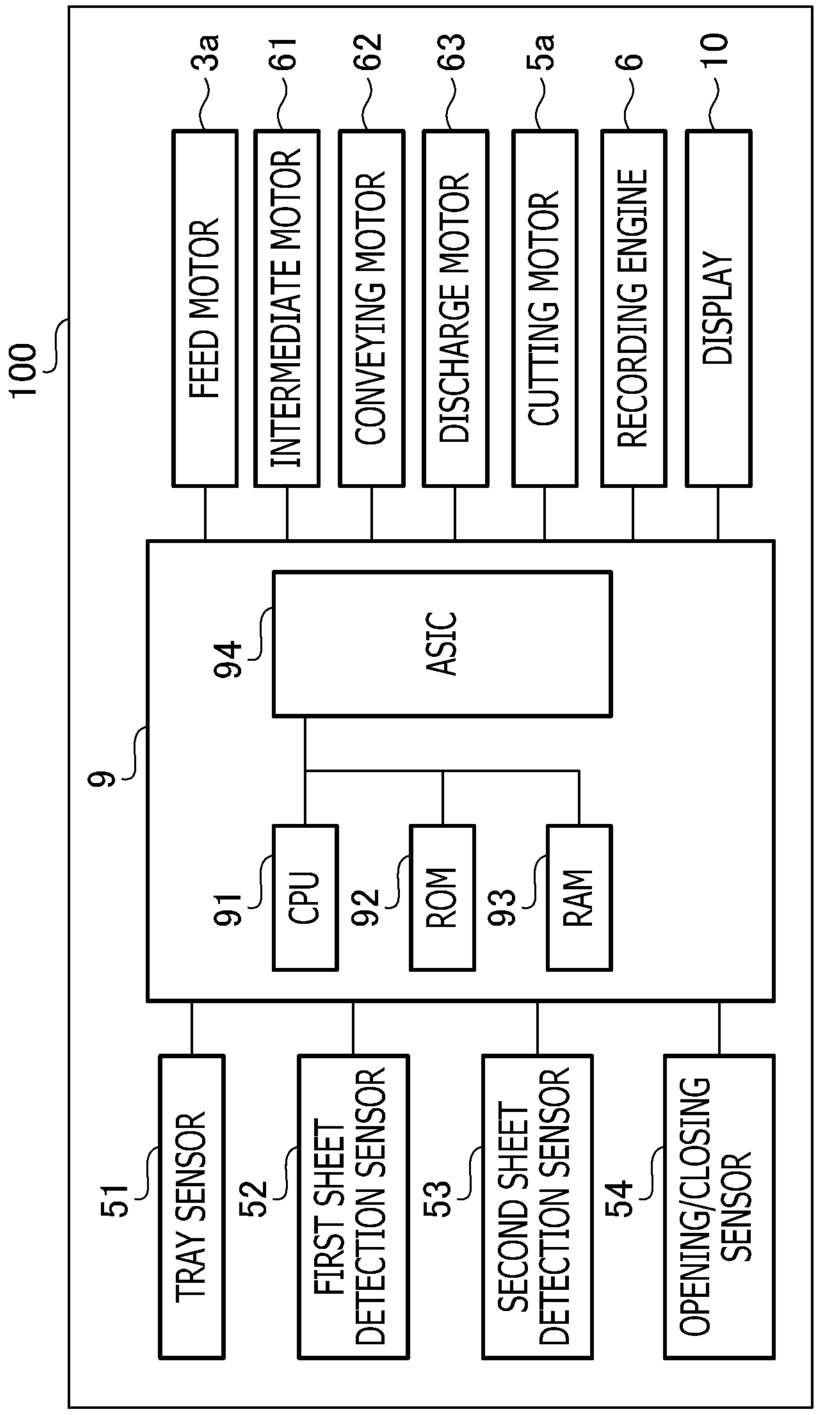
FIG. 2 is a block diagram showing an electrical configuration of the printer shown in FIG. 1.

As shown in FIG. 2, the controller 9 includes a Central Processing Unit (CPU) 91, a Read Only Memory (ROM) 92, a Random Access Memory (RAM) 93, an Application Specific Integrated Circuit (ASIC) 94, and the like. The ROM 92 stores programs executed by the CPU 91 and the ASIC 94, various fixed data, and the like. The RAM 93 temporarily stores data necessary to execute the programs. These components cooperate to control operations of the feed motor 3*a*, the intermediate motor 61, the conveying motor 62, the discharge motor 63, the cutting motor 5*a*, the recording engine 6, the display 10, and the like.

Outline of Control by Controller 9

Next, an outline of the control by the controller 9 will be described with reference to FIG. 3. When recording an image on the sheet P, the controller 9 drives the feed motor 3*a* to rotate the feed roller 3 to feed the sheet P from the feed tray 2, and execute a skew correction process with the intermediate roller pair 41. As will be described later, the controller 9 does not execute the skew correction process when returning from a jam handling.

When the skew correction process is executed, the controller 9 does not drive the intermediate motor 61, the conveying motor 62, and the discharge motor 63 when feeding a leading edge of the sheet P (i.e., an end of the sheet P on the downstream side in the conveying direction) from the feed tray 2. That is, the intermediate roller pair 41, the conveying roller pair 42, and the discharge roller pair 43 are in non-rotating states. After the leading edge of the sheet P is detected by the first sheet detection sensor 52, the feed roller 3 further feeds the sheet P by a prescribed amount. Thus, the feed roller 3 rotates while a state in which the leading edge of the sheet P is in contact with the intermediate roller pair 41 in a non-rotating state is maintained, and the inclination of the sheet P is corrected. When executing the skew correction process with the intermediate roller pair 41, the controller 9 may control the intermediate motor 61 so that the intermediate roller pair 41 rotates in a direction for conveying the sheet P in a direction opposite to the conveying direction (i.e., in a direction for rewinding the sheet P to the roll body R).

The controller 9 is configured to determine whether a jam has occurred while an image is being recorded on the sheet P. For example, the controller 9 determines whether a jam has occurred based on output signals from the first sheet detection sensor 52 and the second sheet detection sensor 53. That is, the controller 9 determines that a jam has occurred when the sheet P is not detected by a sensor (the first sheet detection sensor 52 or the second sheet detection sensor 53) disposed at a position where the sheet P should be if the sheet conveyance is normal.

When it is determined that a jam has occurred, the controller 9 executes cutting of the sheet P with the cutter 5 and notifies the user through the display 10 that the cut-off sheet P needs to be removed. However, the cutter 5 may not be able to cut the sheet P normally when, for instance, the sheet P is deformed. Therefore, for example, if a trailing edge of the sheet P cannot be detected by the first sheet detection sensor 52 even when the sheet P is conveyed after executing the cutting with the cutter 5, the controller 9 determines that the cutting with the cutter 5 has not been normally performed. In such a case, the controller 9 controls the display 10 so that a jam handling screen 71 (see FIG. 3A) is displayed, and notifies the user that the sheet P needs to be cut manually. A process in which the user manually cuts the sheet P is herein referred to as "jam handling."

In the jam handling, first, the user opens the cover 8, cuts the sheet P with scissors or the like, and removes the cut-off sheet P. Then, the user resets the sheet P. That is, the user detaches the feed tray 2 from the housing 1, rewinds the unwound sheet P to the roll body R, sets the roll body R in the roll body accommodating part 25 again, rotates the roll body R to feed the sheet P from the roll body accommodating part 25, and attaches the feed tray 2 to the housing 1 in a state where the leading edge of the sheet P is fed up to near the rear end portion of the feed tray 2. The feed roller 3 thereby contacts the sheet P, and thus the sheet P can be fed using the feed roller 3.

The controller 9 is configured to determine whether the jam handling has been executed. For example, the controller 9 determines whether the jam handling has been executed based on an output signal from the tray sensor 51. That is, the controller 9 determines that the jam handling has been executed when it detects that the feed tray 2 has been once removed from the housing 1 and then attached to the housing 1 again in order to reset the sheet P.

After the jam handling, the leading edge of the sheet P may not be along the direction perpendicular to the conveying direction of the sheet P (i.e., the width direction) due to the cutting of the sheet P by the user. The leading edge of the sheet P being not along the width direction will be hereinafter referred to as being "oblique." When the leading edge of the sheet P is oblique, if the leading edge of the sheet P is brought into contact with the intermediate roller pair 41 in the non-rotating state to correct skew with the intermediate roller pair 41, the sheet P will skew. Therefore, the controller 9 is configured to be able to execute a leading edge adjustment process of cutting off the leading edge of the sheet P straight along the width direction of the sheet P with the cutter 5 after the jam handling.

The controller 9 controls the display 10 to display a leading edge adjustment process selection screen 72 (see FIG. 3B) when it is determined that the jam handling has been executed. The leading edge adjustment process selection screen 72 includes a message asking whether to execute the leading edge adjustment process. The leading edge adjustment process selection screen 72 also includes an execution button 72*a* for inputting an instruction to execute the leading edge adjustment process and a refusal button 72*b* for inputting an instruction not to execute the leading edge adjustment process. The controller 9 executes the leading edge adjustment process when the instruction to execute the leading edge adjustment process is received from the user through the display.

In the leading edge adjustment process, the controller 9 executes a post-jam conveying process and a cutting process. In the post-jam conveying process, the controller 9 conveys the sheet P so that the leading edge of the sheet P moves from upstream to downstream of the intermediate roller pair 41 in the conveying direction. In the cutting process, the controller 9 controls the cutter 5 so that the sheet P conveyed by the post-jam conveying process to a position where the leading edge of the sheet P is downstream of the intermediate roller pair 41 in the conveying direction is cut by the cutter 5 in a state nipped by the intermediate roller pair 41.

In the post-jam conveying process, the controller 9 controls the intermediate motor 61 so that the intermediate roller pair 41 rotates in the forward direction while nipping the sheet P that has reached the intermediate roller pair 41, thereby conveying the sheet P in the conveying direction. When executing the post-jam conveying process, the controller 9 does not execute the skew correction process described above.

A length of the sheet P along the conveying path in the conveyer 4 between the intermediate roller pair 41 and the conveying roller pair 42 is herein defined as L1. The controller 9 controls a conveying amount of the sheet P in the post-jam conveying process so that a length L2 in the conveying direction of the sheet P being cut off in the cutting process (the sheet P downstream of the cutter 5 in the conveying direction) becomes less than L1.

Figure 3A:
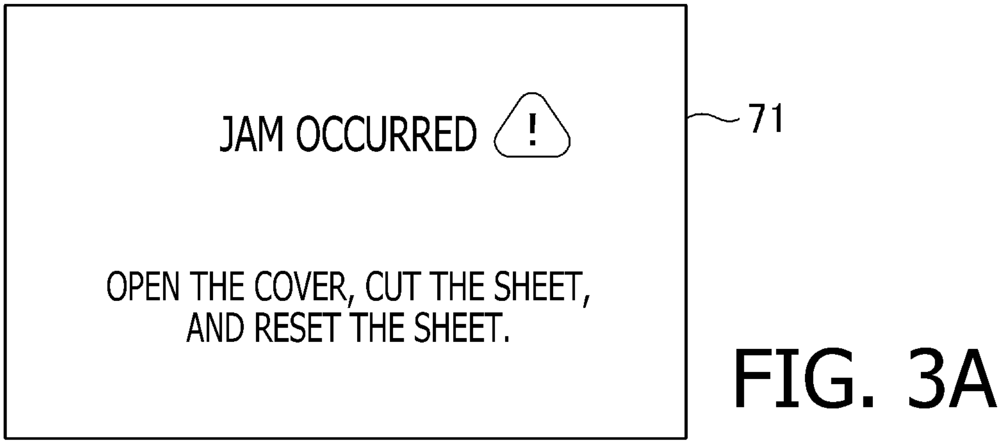
FIG. 3A is a diagram showing a jam handling screen displayed on a display.
Figure 3B:
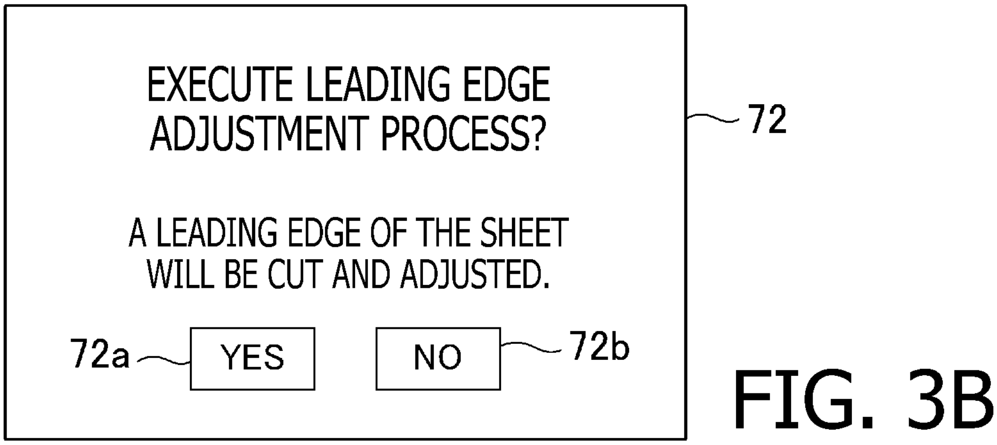
FIG. 3B is a diagram showing a leading edge adjustment process selection screen displayed on the display.
Figure 3C:
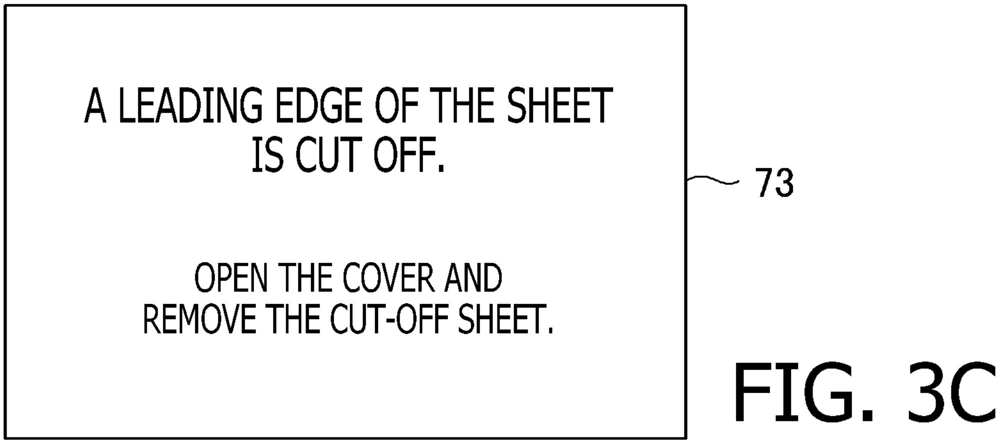
FIG. 3C is a diagram showing a sheet removal notification screen displayed on the display.

After executing the leading edge adjustment process (cutting process), the controller 9 controls the display 10 to display a sheet removal notification screen 73 (see FIG. 3C). The sheet removal notification screen 73 includes a message prompting the user to remove the cut-off sheet P.

By executing the leading edge adjustment process described above, the leading edge of the sheet P becomes straight along the width direction of the sheet P. Therefore, when subsequently recording an image recorded on the sheet P, the skew correction process can be properly executed with the intermediate roller pair 41.

Control Flow by Controller 9

Figure 4:
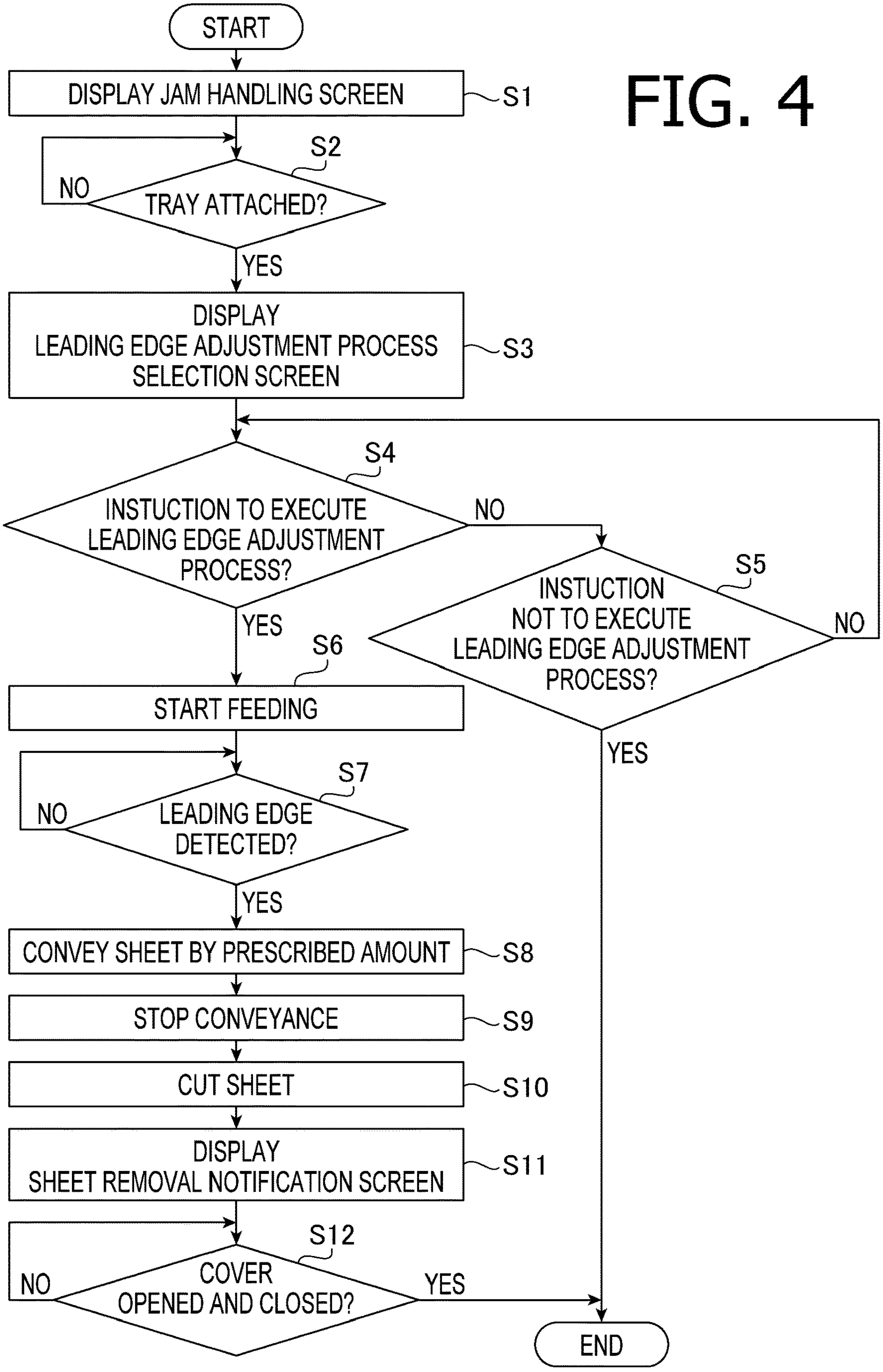
FIG. 4 is a flowchart showing a control flow executed by a controller.

Next, an example of a control flow executed by the controller 9 when a jam requiring the user's jam handling occurs will be described with reference to the flowchart shown in FIG. 4.

First, the controller 9 controls the display 10 to display the jam handling screen 71 (S1). As shown in FIG. 3A, the jam handling screen 71 includes a message prompting the user to open the cover 8, cut the sheet P, and reset the sheet P. At this time, the user cuts the sheet P, removes the feed tray 2 from the housing 1 to reset the sheet P, and then attaches the feed tray 2 to the housing 1 again.

Then, the controller 9 determines whether the feed tray 2 has been attached to the housing 1 based on the output signal from the tray sensor 51 (S2: jam handling detection process). The process in S2 is repeated until it is determined that the feed tray 2 has been attached to the housing 1.

When it is determined that the feed tray 2 has been attached to the housing 1 (S2: YES), the controller 9 controls the display 10 to display the leading edge adjustment process selection screen 72 (S3). At this time, the user operates either the execution button 72*a* or the refusal button 72*b* displayed on the leading edge adjustment process selection screen 72.

Then, the controller 9 determines whether the user has operated the execution button 72*a*, that is, whether the instruction to execute the leading edge adjustment process has been received through the display 10 (S4). When it is determined that the instruction to execute the leading edge adjustment process has not been received (S4: NO), the controller 9 determines whether the user has operated the refusal button 72*b*, that is, whether the instruction not to execute the leading edge adjustment process has been received through the display 10 (S5). When it is determined that the instruction not to execute the leading edge adjustment process has not been received (S5: NO), the controller 9 executes the determination of S4 again. On the other hand, when it is determined that the instruction not to execute the leading edge adjustment process has been received (S5: YES), the controller 9 ends the process.

When it is determined that the instruction to execute the leading edge adjustment process has been received (S4:

YES), the controller 9 controls the feed motor 3*a* to feed the leading edge of the sheet P from the feed tray 2 and start feeding the sheet P (S6: post-jam conveying process). Then, the controller 9 determines whether the leading edge of the sheet P has been detected by the first sheet detection sensor 52 (S7). The determination in S7 is repeated until it is determined that the leading edge of the sheet P has been detected by the first sheet detection sensor 52.

When it is determined that the leading edge of the sheet P has been detected by the first sheet detection sensor 52 (S7: YES), the controller 9 controls the intermediate motor 61 to rotate the intermediate roller pair 41 in the forward direction. The controller 9 may control the intermediate motor 61 to rotate the intermediate roller pair 41 in the forward direction at the time when the feeding of the sheet P is started in S6.

Then, the controller 9 controls the feed motor 3*a* and the intermediate motor 61 to convey the sheet P by a prescribed amount in the conveying direction (S8: post-jam conveying process). Specifically, the controller 9 conveys the sheet P until the leading edge of the sheet P reaches a prescribed position between the intermediate roller pair 41 and the conveying roller pair 42. That is, the sheet P is conveyed so that the leading edge thereof moves from upstream to downstream of the intermediate roller pair 41 in the conveying direction. In the post-jam conveying process, the sheet P that has reached the intermediate roller pair 41 is conveyed in the conveying direction while being nipped by the intermediate roller pair 41 rotating in the forward direction.

Then, the controller 9 controls the feed motor 3*a* and the intermediate motor 61 to stop the conveyance of the sheet P (S9). Then, the controller 9 controls the cutter 5 to cut the sheet P conveyed to the position where the leading edge is downstream of the intermediate roller pair 41 in the conveying direction while being nipped by the intermediate roller pair 41 (S10).

Then, the controller 9 controls the display 10 to display the sheet removal notification screen 73 (S11). At this time, the user opens the cover 8, removes the cut-off sheet P, and then closes the cover 8. Then, the controller 9 determines whether the cover 8 has been opened and closed based on the output signal from the opening/closing sensor 54 (S12). The determination in S12 is repeated until it is determined that the cover 8 has been opened and closed. When it is determined that the cover 8 has been opened and closed (S12: YES), the controller 9 ends the process.

As described above, the printer 100 according to the present embodiment includes the cutter 5 configured to cut the sheet P along a direction perpendicular to the conveying direction, the conveyer 4 including the intermediate roller pair 41 disposed downstream of the cutter 5 in the conveying direction and configured to nip the sheet P and rotate in the forward direction being the direction for conveying the nipped sheet P in the conveying direction, and the controller 9. The controller 9 executes, after it is detected that the jam handling process of the sheet P has been executed, the post-jam conveying process of conveying the sheet P so that the leading edge of the sheet P moves from upstream to downstream of the intermediate roller pair 41 in the conveying direction, and the cutting process of cutting the sheet P conveyed by the post jam conveying process to the position where the leading edge is downstream of the intermediate roller pair 41 in the conveying direction with the cutter 5 while nipping the sheet P with the intermediate roller pair 41. When executing the post-jam conveying process, the controller 9 does not execute the skew correction process of controlling the conveyer 4 such that the leading edge of the sheet P comes into contact with the intermediate roller pair 41 while not rotating the intermediate roller pair 41 in the forward direction.

With the above-described configuration, even when the sheet P is cut diagonally by the user in the jam handling, the sheet P can be cut straight (i.e., along the direction orthogonal to the conveying direction) by executing, after the jam handling, the cutting process after the execution of the post-jam conveying process without executing the skew correction process.

In the printer 100 of the above-described embodiment, the controller 9 displays the leading edge adjustment process selection screen 72 on the display 10 when it is determined that the jam handling has been executed (i.e., when the attachment of the feed tray 2 to the housing 1 is detected). Then, when the execution button 72*a* displayed on the leading edge adjustment process selection screen 72 is operated by the user (i.e., when the instruction to execute the leading edge adjustment process is received through the display 10), the controller 9 executes the leading edge adjustment process (i.e., the post-jam conveying process and the cutting process). Therefore, the user can select whether to execute the leading edge adjustment process or not. Thus, it is possible to avoid wasting the sheet P by executing unnecessary leading edge adjustment process.

In the printer 100 of the above-described embodiment, the length L2 in the conveying direction of the sheet P being cut off in the cutting process is less than the length L1 of the sheet P along the conveying path for the sheet P in the conveyer 4 between the intermediate roller pair 41 and the conveying roller pair 42. With such configuration, the waste of the sheet P can be reduced as compared with the case where the length L2 of the sheet P being cut off in the cutting process is equal to or greater than L1.

In the printer 100 of the above-described embodiment, the controller 9 displays the sheet removal notification screen 73 on the display 10 after executing the cutting process. If the length L2 of the sheet P being cut off in the cutting process is less than L1, the sheet P cut in the cutting process cannot be conveyed by nipping with the conveying roller pair 42. Therefore, the cut-off sheet P cannot be conveyed downstream of the intermediate roller pair 41 and discharged to the discharge tray 7. However, with the above-mentioned configuration, the sheet removal notification screen 73 can be displayed on the display 10 to notify the user that the cut-off sheet P needs to be removed.

Modification

Next, a modification of the printer 100 will be described with reference to FIGS. 5A to 8B. The printer 100 according to the modification mainly differs from the printer 100 described above in the contents of the leading edge adjustment process. Hereinafter, the same components as those of the embodiment described above are denoted by the same reference numerals and description thereof will be omitted as appropriate.

In the modification, the driven roller 41*b* of the intermediate roller pair 41 is configured to move between a nipping position for nipping the sheet P together with the drive roller 41*a* and a retracted position for not nipping the sheet P together with the drive roller 41*a* in conjunction with the opening and closing of the cover 8.

Figure 5A:
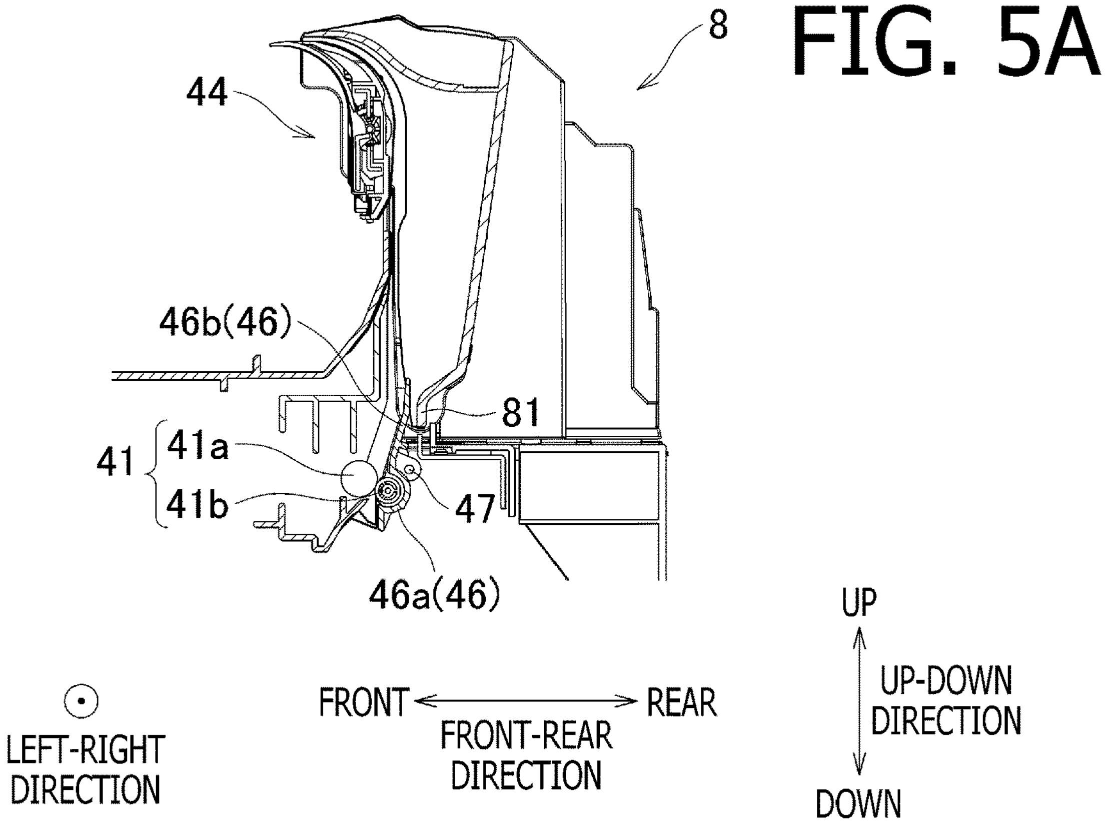
FIG. 5A is a diagram for explaining a moving mechanism of a driven roller of an intermediate roller pair in a modification of the printer shown in FIGS. 1 and 2, and shows a state in which the driven roller is at a nipping position.
Figure 5B:
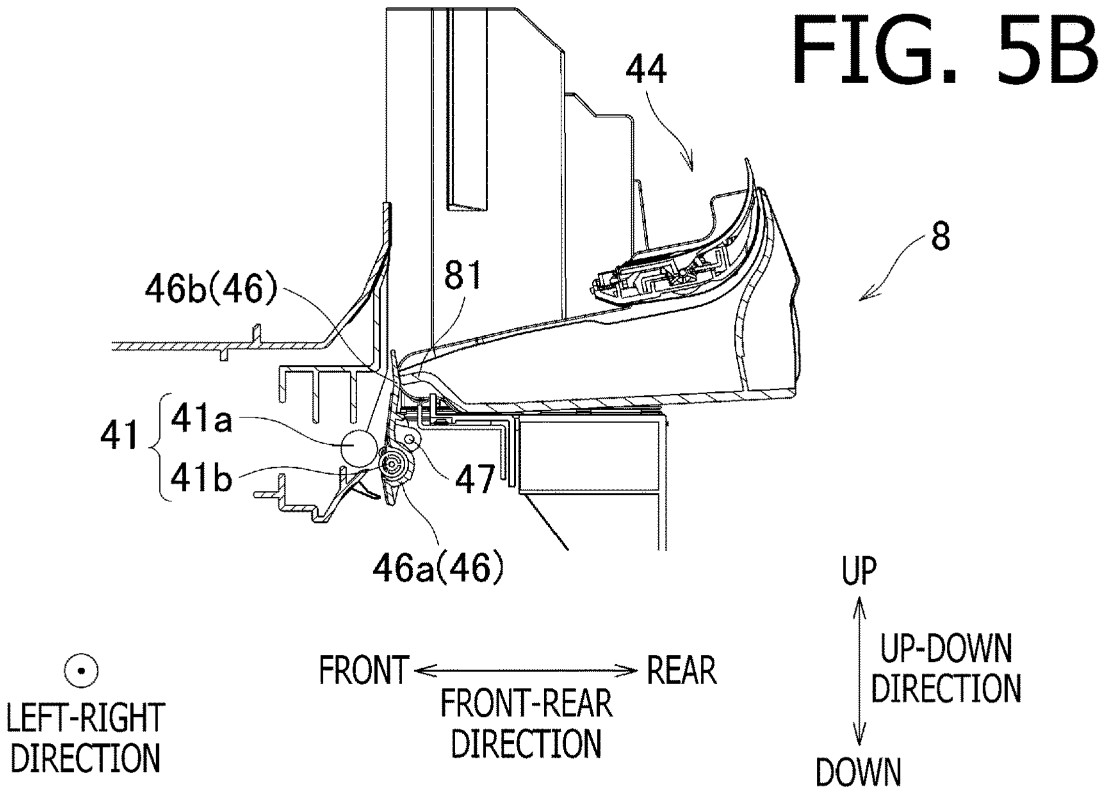
FIG. 5B is a diagram for explaining the moving mechanism of the driven roller of the intermediate roller pair in the modification of the printer shown in FIG. 1, and shows a state in which the driven roller is at the retracted position.

As shown in FIGS. 5A and 5B, the driven roller 41*b* is supported by a roller holder 46. The roller holder 46 has a support part 46*a* configured to support the driven roller 41*b*, and an extended part 46*b* extending upward from the support part 46*a*. The roller holder 46 is configured to rotate about a shaft 47. The shaft 47 extends in the left-right direction and is located between the support part 46*a* and an upper end portion of the extended part 46*b*. The roller holder 46 is biased by a conventionally-known biasing member such as a spring in a direction in which the driven roller 41*b* approaches the drive roller 41*a*.

As shown in FIG. 5A, a lower end portion of the cover 8 is provided with an opposing part 81 that faces the upper end portion of the extended part 46*b* of the roller holder 46 with a slight gap therebetween when the cover 8 is closed and positioned at the covering position. The opposing part 81 of the cover 8 is positioned behind the extended part 46*b* of the roller holder 46. When the cover 8 is at the covering position, the driven roller 41*b* is pressed against the drive roller 41*a*. That is, the driven roller 41*b* is at the nipping position for nipping the sheet P together with the drive roller 41*a*.

As shown in FIG. 5B, when the cover 8 is opened to the exposed position, the opposing part 81 of the cover 8 pushes the extended part 46*b* of the roller holder 46 forward. At this time, the roller holder 46 rotates about the shaft 47 in a counterclockwise direction in FIG. 5B against the biasing force by the biasing member. As a result, the driven roller 41*b* moves rearward and separates from the drive roller 41*a*. That is, the driven roller 41*b* moves to the retracted position for not nipping the sheet P together with the drive roller 41*a*.

The guide member 44 is supported by the cover 8. Therefore, as shown in FIG. 5B, when the cover 8 is moved from the covering position to the exposing position, the guide member 44 moves to a position away from the conveying path in the conveyer 4.

Figure 6A:
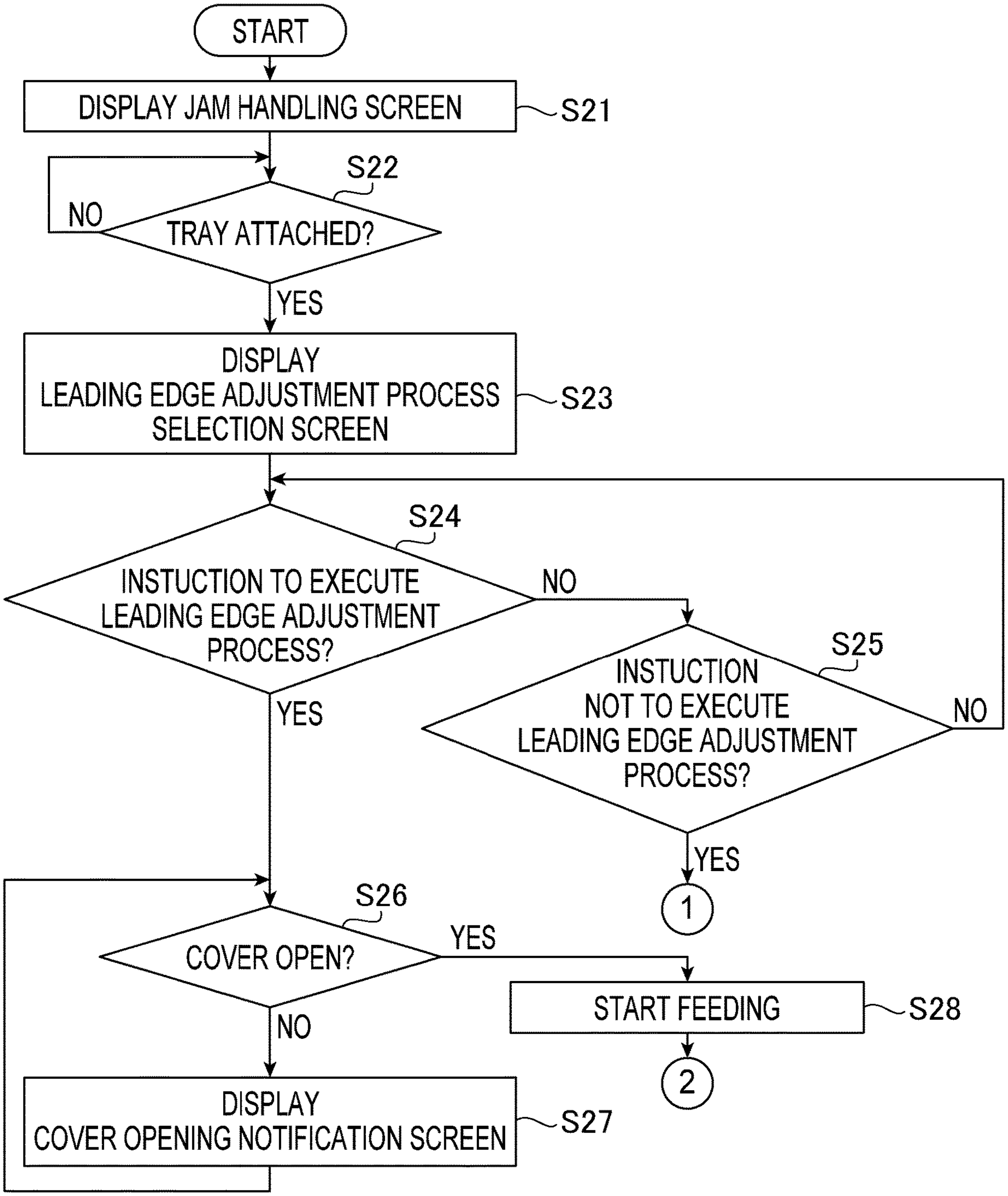
FIGS. 6A and 6B show a flowchart illustrating a control flow executed by the controller in the modification.
Figure 6B:
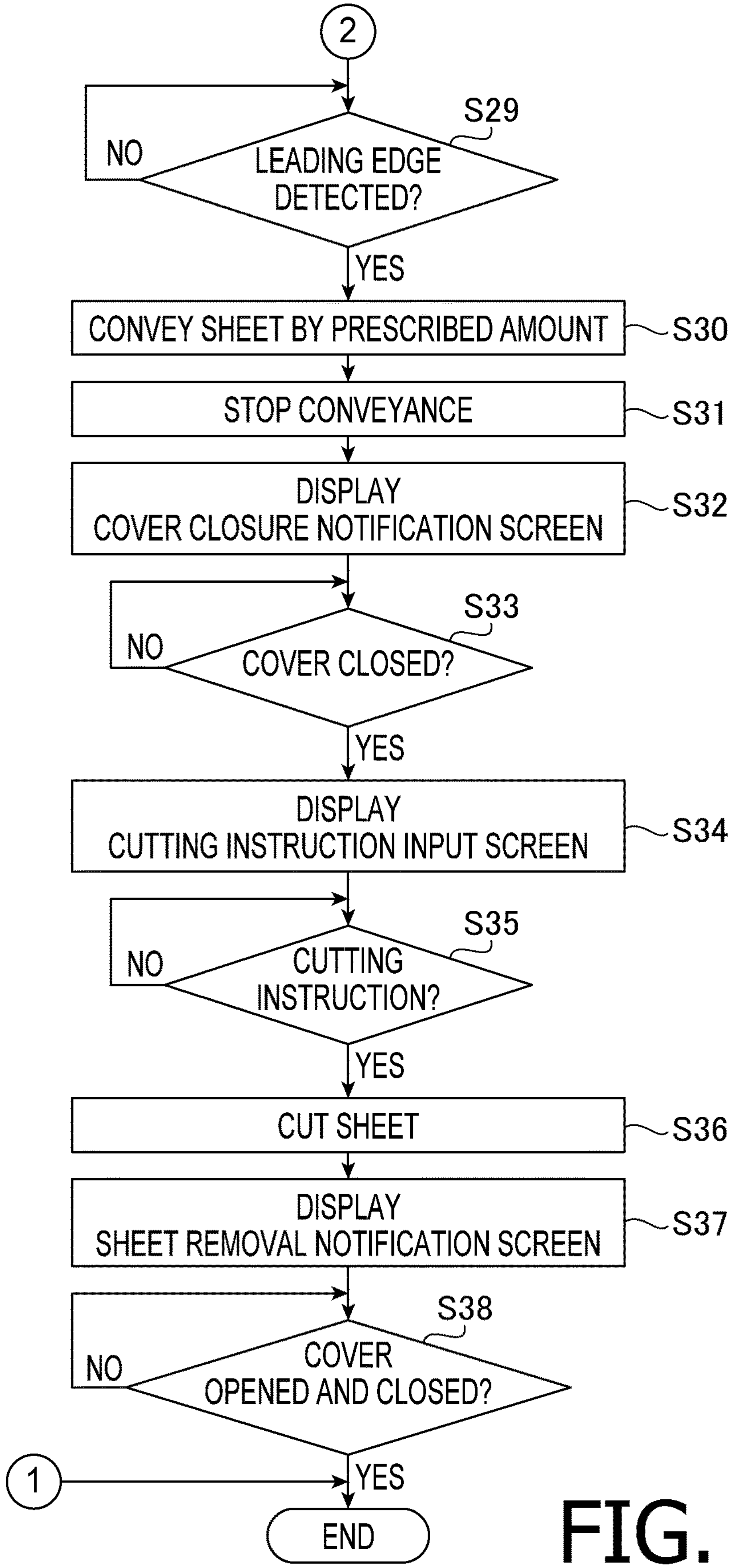

Next, an example of the control flow executed by the controller 9 in this modification when a jam requiring the user's jam handling occurs will be described with reference to the flowchart shown in FIGS. 6A and 6B.

First, the controller 9 controls the display 10 to display a jam handling screen 171 (see FIG. 7A) (S21). As with the jam handling screen 71 of the above-described embodiment, the jam handling screen 171 of the variation includes a message prompting the user to open the cover 8, cut the sheet P, and reset the sheet P. In addition, a message prompting the user not to close the cover 8 is also included in the jam handling screen 171.

Figure 7A:
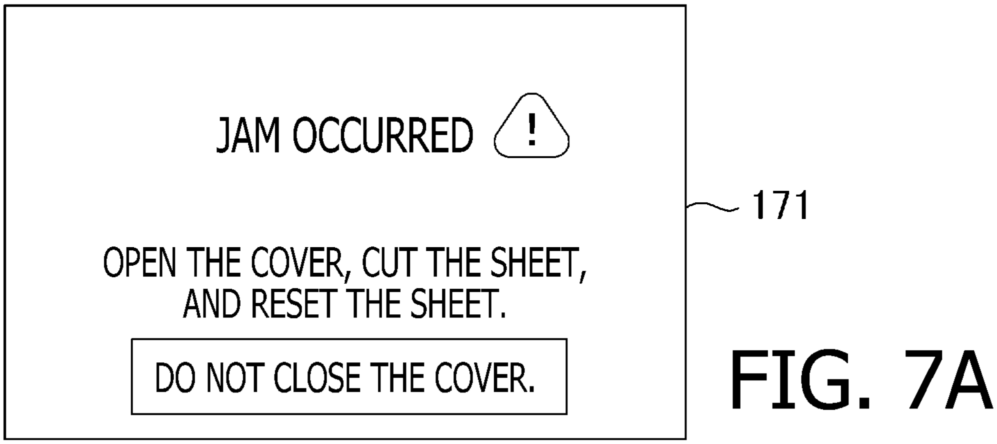
FIG. 7A is a diagram showing another jam handling screen displayed on the display.
Figure 7B:
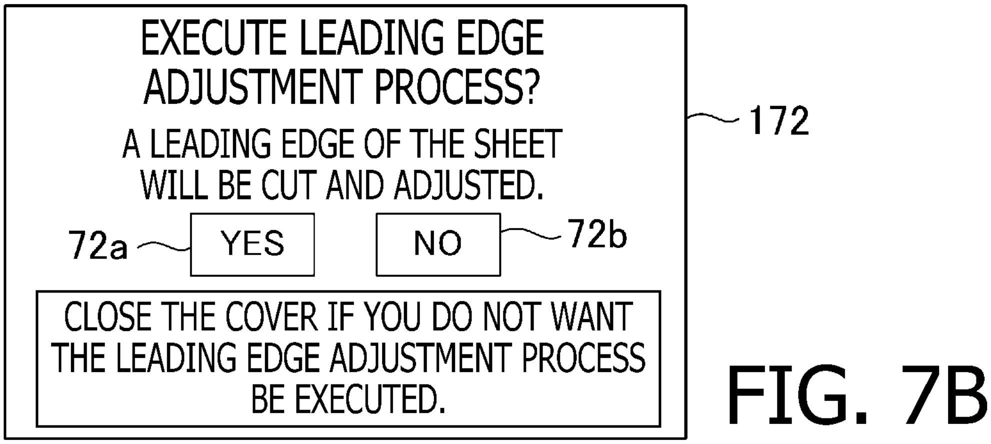
FIG. 7B is a diagram showing another leading edge adjustment process selection screen displayed on the display.

Since subsequent processes in S22 to S25 are the same as those in S2 to S5 of the above-described embodiment except for contents of a leading edge adjustment process selection screen 172 (see FIG. 7B) to be displayed on the display 10 in S23, description thereof is herein omitted. As shown in FIG. 7B, as in the above-described embodiment, the leading edge adjustment process selection screen 172 in this modification includes the message asking whether to execute the leading edge adjustment process, the execution button 72*a*, and the refusal button 72*b*. In addition, a message prompting the user to close the cover 8 when not executing the leading edge adjustment process is included in the leading edge adjustment process selection screen 172.

Figure 7C:
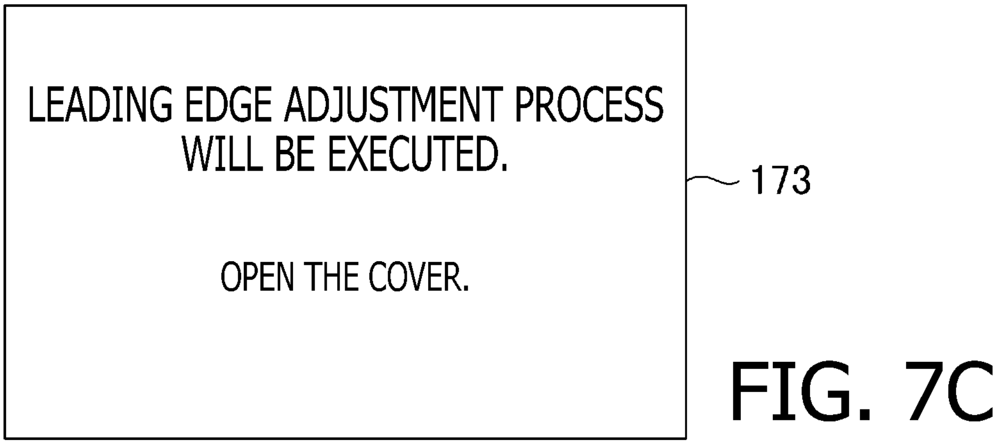
FIG. 7C is a diagram showing a cover opening notification screen displayed on the display.

When it is determined in S24 that the instruction to execute the leading edge adjustment process has been received (S24: YES), the controller 9 determines whether the cover 8 is open based on the output signal from the opening/closing sensor 54 (S26). When it is determined that the cover 8 is not open (S26: NO), the controller 9 controls the display 10 to display a cover opening notification screen 173 (see FIG. 7C) (S27). As shown in FIG. 7C, a message prompting the user to open the cover 8 is displayed on the cover opening notification screen 173. After displaying the cover opening notification screen 173 on the display 10, the controller 9 executes the determination of S26 again.

When it is determined that the cover 8 is open (S26: YES), the controller 9 controls the feed motor 3*a* to feed the leading edge of the sheet P from the feed tray 2 to start the feeding of the sheet P (S28: post-jam feeding process). At this time, since the cover 8 is open, the driven roller 41*b* of the intermediate roller pair 41 is at the retracted position for not nipping the sheet P together with the drive roller 41*a*. Then, the controller 9 determines whether the leading edge of the sheet P has been detected by the first sheet detection sensor 52 (S29). The determination in S29 is repeated until it is determined that the leading edge of the sheet P has been detected by the first sheet detection sensor 52.

When it is determined that the leading edge of the sheet P has been detected by the first sheet detection sensor 52 (S29: YES), the controller 9 controls the feed motor 3*a* to convey the sheet P is by a prescribed amount in the conveying direction (S30: post-jam conveying process). In the post-jam conveying process, the sheet P is conveyed so that the leading edge of the sheet P moves from upstream to downstream of the intermediate roller pair 41 in the conveying direction without being nipped by the intermediate roller pair 41. In this modification, in the post-jam conveying process, the controller 9 conveys the sheet P until the leading edge of the sheet P reaches a prescribed position between the intermediate roller pair 41 and a lower end portion (i.e., an upstream end in the conveying direction) of the guide member 44 when the cover 8 is at the covering position.

Figure 8A:
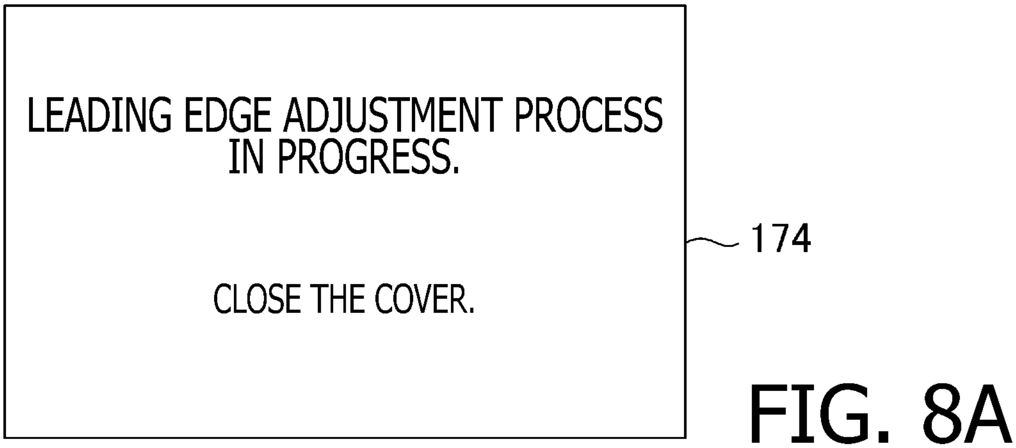
FIG. 8A is a diagram showing a cover closing notification screen displayed on the display.

Then, the controller 9 controls the feed motor 3*a* to stop conveying the sheet P (S31). The controller 9 further controls the display 10 to display a cover closure notification screen 174 (see FIG. 8A) (S32). As shown in FIG. 8A, a message prompting the user to close the cover 8 is displayed in the cover closure notification screen 174. As described above, in the post-jam conveying process, the sheet P is conveyed until the leading edge of the sheet P reaches a prescribed position between the intermediate roller pair 41 and the lower end portion of the guide member 44 when the cover 8 is at the covering position. Therefore, the sheet P and the guide member 44 do not interfere with each other when closing the cover 8.

Figure 8B:
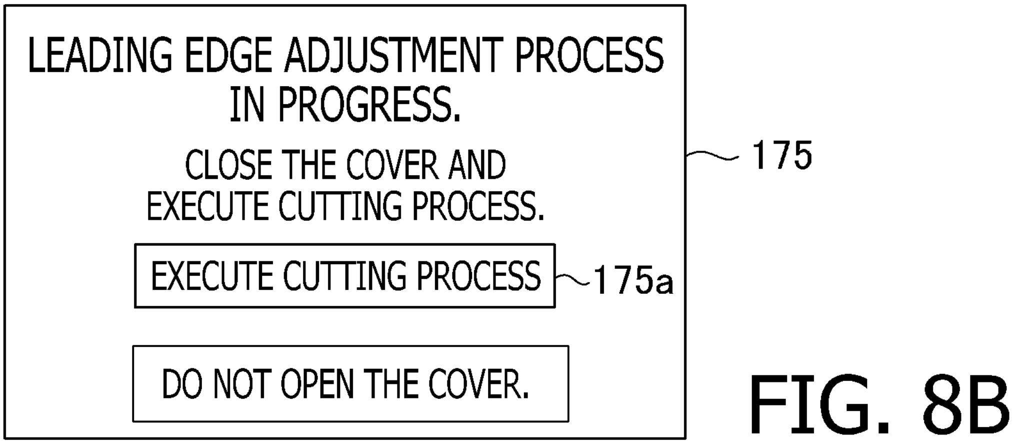
FIG. 8B is a diagram showing a cutting instruction input screen displayed on the display.

Then, the controller 9 determines whether the cover 8 is closed based on the output signal from the opening/closing sensor 54 (S33). The determination in S33 is repeated until it is determined that the cover 8 is closed. When it is determined that the cover 8 is closed (S33: YES), the controller 9 controls the display 10 to display a cutting instruction input screen 175 (see FIG. 8B) (S34). As shown in FIG. 8B, the cutting instruction input screen 175 includes an input button 175*a* for instructing execution of the cutting process to cut the sheet P. The user can input an instruction to execute the cutting process by operating the input button 175*a*.

Then, the controller 9 determines whether the input button 175*a* has been operated by the user, that is, the instruction to execute the cutting process has been received through the display 10 (S35). The determination in S35 is repeated until it is determined that the instruction to execute the cutting process has been received. When it is determined that the instruction to execute the cutting process has been received (S35: YES), the controller 9 executes the processes in S36 to S38. Since the processes in S36 to S38 are the same as the processes in S10 to S12 of the above-described embodiment, the descriptions thereof are herein omitted.

As described above, in the printer 100 according to this modification, similarly to the above-described embodiment, the sheet P can be cut straight (i.e., along the direction orthogonal to the conveying direction).

In this modification, the driven roller 41*b* of the intermediate roller pair 41 is at a position for nipping the sheet P together with the drive roller 41*a* when the cover 8 is closed and positioned at the covering position, and is at a position for not nipping the sheet P together with the drive roller 41*a* when the cover 8 is open and positioned at the exposing position. The controller 9 executes the post-jam conveying process when the cover 8 is at the exposing position. Therefore, by executing the post-jam conveying process after the cover 8 is opened to move to the exposing position and the jam handling is executed and before the cover 8 is returned to the covering position, it is possible to execute the post-jam conveying process without performing the skew correction process.

In this modification, the controller 9 executes the cutting process after the cover 8 is closed to move from the exposing position to the covering position. The sheet P is nipped by the intermediate roller pair 41 by moving the cover 8 to the covering position. Therefore, in the cutting process, the sheet P nipped by the intermediate roller pair 41 is cut and thus the sheet P can be cut normally.

In addition, in this modification, the printer 100 includes a display 10 configured to receive an input from a user, and when the instruction to execute the cutting process is received through the display 10 after the cover 8 is closed to move from the exposing position to the covering position, the controller 9 execute the cutting process. Therefore, the cutting process is executed after the user has given the instruction to execute the cutting process, it is less likely that the cover 8 will be opened during the cutting process.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment and modification, the controller 9 determines that the jam handling has been executed when the tray sensor 51 detects that the feed tray 2 has been attached to the housing 1. However, for example, the printer 100 may include an input interface such as a button to be operated by the user after executing the jam handling, and the controller 9 may determine that the jam handling has been performed when the input interface is operated. In the above-described embodiment, the controller 9 may determine that the jam handling has been executed when the opening/closing sensor 54 detects that the cover 8 has been closed.

In the above-described modification, the controller 9 executes the cutting process when the instruction to execute the cutting process is received through the display 10 after the cover 8 is closed to move from the exposing position to the covering position. However, for example, the controller 9 may execute the cutting process when the opening/closing sensor 54 detects that the cover 8 has been closed.

In the above-described embodiment, the controller 9 executes the leading edge adjustment process when the instruction to execute the leading edge adjustment process is received through the display 10. However, for example, the controller 9 may execute the leading edge adjustment process after the execution of the jam handling regardless of the user's intention.

Figure 9:
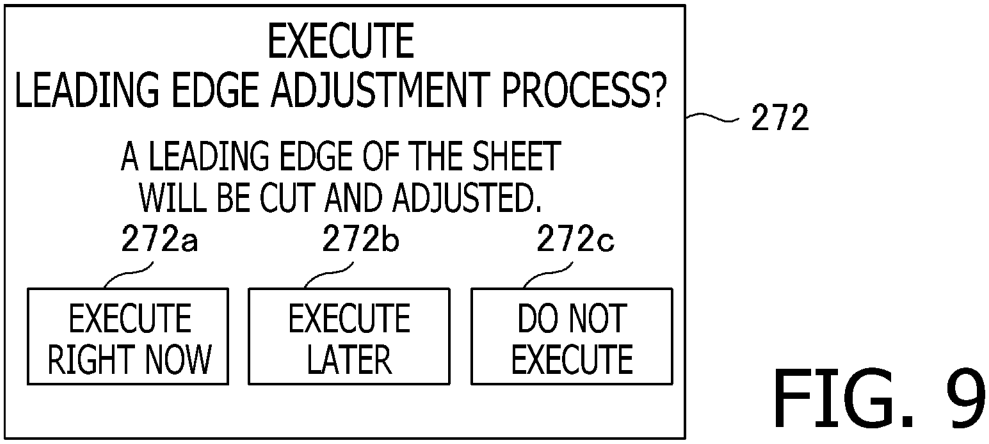
FIG. 9 is a diagram showing another leading edge adjustment process selection screen according to another modification of the printer shown in FIGS. 1 and 2.

In the above-described embodiment, the leading edge adjustment process selection screen 72 includes the execution button 72*a* for inputting an instruction to execute the leading edge adjustment process and the refusal button 72*b* for inputting an instruction not to execute the leading edge adjustment process. However, for example, as shown in FIG. 9, a leading edge adjustment process selection screen 272 according to another modification of the first embodiment includes a first execution button 272*a* for inputting an instruction to execute the leading edge adjustment process immediately, a second execution button 272*b* for inputting an instruction to execute the leading edge adjustment process later, and a refusal button 272*c* for inputting an instruction not to execute the leading edge adjustment process. The first execution button 272*a* corresponds to the execution button 72*a* of the leading edge adjustment process selection screen 72. When the second execution button 272*b* is operated by the user, the controller 9 displays the leading edge adjustment process selection screen 272 again on the display 10 after, for example, completion of the print job being executed.

In the above-described embodiment, the length L2 in the conveying direction of the sheet P being cut off in the cutting process is less than the length L1 of the sheet P along the conveying path in the conveyer 4 between the intermediate roller pair 41 and the conveying roller pair 42. However, the length L2 of the sheet P being cut off in the cutting process may be equal to or greater than L1. In this case, the sheet P cut in the cutting process can be conveyed with the intermediate roller pair 41 to a position where the sheet P is nipped by the conveying roller pair 42. Therefore, the sheet P cut in the cutting process can be conveyed with the conveyer 4 and discharged on the discharge tray 7. This eliminates the need for the user to remove the cut-off sheet P.

In the above-described embodiment, in the jam handling, the cutting of the jammed sheet P is executed manually by the user. However, an automatic jam handling device (e.g., a cutting device configured to cut off the jammed sheet P without the need of the user's operation) may be provided and the jam handling may be automated.

In the above-described embodiment, the sheet removal notification screen 73 is displayed on the display 10 after the execution of the cutting process. However, the sheet removal notification screen 73 may not be displayed.

In the above-described embodiment, the printer includes the touch panel type display 10 functioning as a notifier and an input interface. However, a speaker or the like configured to make notification by voice may be employed as the notifier, and one or more physical buttons may be employed as the input interface.

Aspects of the present disclosure can be applied to any image recording apparatus configured to record an image on a recording medium unwound from a roll body. For example, aspects of the present disclosure can be applied not only to an ink jet printer including a head configured to discharge ink from nozzles as a recording engine, but also to an electrophotographic printer including a laser type recording engine configured to form an electrostatic latent image by exposing a photosensitive member with a laser or an LED type recording engine configured to form an electrostatic latent image by exposing a photosensitive member with an LED. The recording medium is not limited to paper but may be, for example, cloth or resin material such as film.

The printer 100 is an example of an "image recording apparatus" according to aspects of the present disclosure. The sheet P is an example of a "recording medium" according to aspects of the present disclosure. The conveying roller pair 42 is an example of a "downstream roller pair" according to aspects of the present disclosure. The tray sensor 51 is an example of a "jam handling detector" according to aspects of the present disclosure.

What is claimed is:

1. An image recording apparatus configured to record an image on a recording medium unwound from a roll body in which a long recording medium is wound in a roll shape, comprising:
- a conveyer configured to convey the recording medium in a conveying direction;
- a cutter configured to cut the recording medium along a direction perpendicular to the conveying direction;
- a recording engine configured to record an image on the recording medium;
- a jam handling detector configured to detect that a jam handling of cutting the recording medium has been executed; and
- a controller,
- wherein the conveyer includes a roller pair that is disposed downstream of the cutter in the conveying direction, configured to nip the recording medium, and configured to rotate in a forward rotation direction which is a direction for conveying the nipped recording medium in the conveying direction, and
- wherein the controller:
  - executes a post-jam conveyance of conveying the recording medium such that a leading edge, which is a downstream end of the recording medium in the conveying direction, moves from upstream to downstream of the roller pair in the conveying direction after the jam handling detector detects that the jam handling has been executed;
  - executes cutting of the recording medium conveyed to a position where the leading edge is downstream of the roller pair in the conveying direction by the post-jam conveyance with the cutter while nipping the leading edge with the roller pair; and
  - does not execute a skew correction when executing the post-jam conveyance, wherein, in the skew correction, the controller controls the conveyer to cause the leading edge to come into contact with the roller pair while not causing the roller pair to rotate in the forward rotation direction.

2. The image recording apparatus according to claim 1, wherein, in the post-jam conveyance, the controller controls the conveyer to rotate the roller pair in the forward rotation direction while nipping the recording medium reaching the roller pair so that the recording medium is conveyed.

3. The image recording apparatus according to claim 1, further comprising a cover configured to take a covering position at which the cover covers at least a portion of a conveying path for the recording medium in the conveyer and an exposing position at which the at least a portion of the conveying path is exposed, wherein the roller pair includes a first roller and a second roller, wherein the second roller is at a position for nipping the recording medium together with the first roller when the cover is at the covering position, and is at a position for not nipping the recording medium together with the first roller when the cover is at the exposing position, and wherein the controller executes the post-jam conveyance when the cover is at the exposing position.

4. The image recording apparatus according to claim 3, wherein the controller executes the cutting after the cover has moved from the exposing position to the covering position.

5. The image recording apparatus according to claim 4, further comprising an input interface configured to receive an input from a user, wherein the controller executes the cutting when an instruction to execute the cutting is received through the input interface after the cover has moved from the exposing position to the covering position.

6. The image recording apparatus according to claim 3, wherein the cover includes a guide member disposed downstream of the roller pair in the conveying direction and configured to guide the recording medium conveyed by the roller pair when the cover is at the covering position, and wherein, in the post-jam conveyance when the cover is at the exposing position, the controller controls the conveyer such that the recording medium is conveyed until the leading edge reaches a position between the roller pair and an upstream end portion of the guide member in the conveying direction when the cover is at the covering position.

7. The image recording apparatus according to claim 3, further comprising a notifier configured to notify a user of information, wherein the controller prompt the user to move the cover from the exposing position to the covering position through the notifier after executing the cutting.

8. The image recording apparatus according to claim 1, further comprising an input interface configured to receive an input from a user, wherein the controller executes the post-jam conveyance and the cutting when an instruction to execute the post-jam conveyance and the cutting is received through the input interface after the jam handling detector detects that the jam handling has been executed.

9. The image recording apparatus according to claim 1, wherein the conveyer further includes a downstream roller pair disposed downstream of the roller pair in the conveying direction and configured to nip the recording medium, and wherein the controller controls an amount of conveyance of the recording medium in the post-jam conveyance so that a length in the conveying direction of the recording medium being cut off in the cutting is shorter than a length of the recording medium along a conveying path for the recording medium in the conveyer between the roller pair and the downstream roller pair.

10. The image recording apparatus according to claim 9, further comprising a notifier configured to notify a user of information, wherein the controller prompts the user to remove the cut-off recording medium through the notifier after executing the cutting.

11. The image recording apparatus according to claim 1, wherein the conveyer further includes a downstream roller pair disposed downstream of the roller pair in the conveying direction and configured to nip the recording medium, and wherein the controller controls an amount of conveyance of the recording medium in the post-jam conveyance so that a length in the conveying direction of the recording medium being cut off in the cutting is longer than a length of the recording medium along a conveying path for the recording medium in the conveyer between the roller pair and the downstream roller pair.

12. The image recording apparatus according to claim 11, further comprising a discharge tray configured to receive the cut-off recording medium conveyed in the conveying direction by the conveyer, wherein the controller causes the conveyer to discharge the cut-off recording medium onto the discharge tray.

13. The image recording apparatus according to claim 1, further comprising a feed tray configured to accommodate the roll body, wherein the jam handling detector is a tray sensor configured to detect insertion and removal of the feed tray into and from the image recording apparatus, and wherein the controller determines that the jam handling has been executed when the tray sensor detects insertion of the feed tray.

14. The image recording apparatus according to claim 1, wherein the jam handling detector is an input interface to be operated by the user after executing the jam handling, and wherein the controller determines that the jam handling has been executed when the input interface is operated.

15. The image recording apparatus according to claim 1, wherein the controller executes the skew correction when conveying the recording medium to execute recording of an image on the recording medium.

16. The image recording apparatus according to claim 1, wherein the jam handling is manually executed by a user.

* * * * *